(12) United States Patent
Amada et al.

(10) Patent No.: US 11,361,182 B2
(45) Date of Patent: *Jun. 14, 2022

(54) BARCODE SCANNER OPTIMIZATION

(71) Applicant: NCR Corporation, Atlanta, GA (US)

(72) Inventors: Janry Corpuz Amada, Kabankalan (PH); Andrew Jeremy Adamec, Buford, GA (US); Kenneth Joseph Fabian, Grayson, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,738

(22) Filed: Nov. 24, 2020

(65) Prior Publication Data

US 2021/0081631 A1    Mar. 18, 2021

Related U.S. Application Data

(63) Continuation of application No. 16/397,712, filed on Apr. 29, 2019, now Pat. No. 10,896,306.

(51) Int. Cl.
*G06K 7/14* (2006.01)
*G06K 7/10* (2006.01)

(52) U.S. Cl.
CPC ....... *G06K 7/1413* (2013.01); *G06K 7/10554* (2013.01)

(58) Field of Classification Search
CPC .......................... G06K 7/1413; G06K 7/10554

USPC ............................................ 235/462.04, 469
See application file for complete search history.

(56) References Cited

U.S. PATENT DOCUMENTS

| 6,375,075 | B1 * | 4/2002 | Ackley .............. | G06K 7/10702 235/462.04 |
| 6,981,644 | B2 * | 1/2006 | Cheong .................. | G06T 1/0021 235/462.04 |
| 8,079,525 | B1 * | 12/2011 | Zolotov ............. | G06K 7/10851 235/469 |
| 8,100,330 | B2 * | 1/2012 | Bulan ....................... | G06K 7/10 235/462.04 |
| 2005/0001033 | A1 * | 1/2005 | Cheong .................. | G06T 1/0021 235/454 |
| 2012/0000983 | A1 * | 1/2012 | Bhagwan ................ | G06K 7/146 235/462.04 |
| 2014/0144991 | A1 * | 5/2014 | Tian ...................... | G06K 7/1443 235/462.04 |

* cited by examiner

*Primary Examiner* — Paultep Savusdiphol
(74) *Attorney, Agent, or Firm* — Schwegman, Lundberg & Woessner

(57) ABSTRACT

Disclosed are barcode scanners and methods for scanning a barcode. The barcode scanners and methods for scanning a barcode may include receiving a raw image from a scanner. Channel information may be extracted from each pixel of the raw image. A composite image may be created using the channel information from each pixel of the raw image. Finally, product information may be extracted from the composite image.

20 Claims, 5 Drawing Sheets

202

|  | Pixel$_{i,1}$ |  | Pixel$_{i,2}$ |  |
|---|---|---|---|---|
| Pixel$_{1,j}$ | $G_{1,1}$ | $R_{1,1}$ | $G_{1,2}$ | $R_{1,2}$ |
|  | $B_{1,1}$ | $H_{1,1}$ | $B_{1,2}$ | $H_{1,2}$ |
| Pixel$_{2,j}$ | $G_{2,1}$ | $R_{2,1}$ | $G_{2,2}$ | $R_{2,2}$ |
|  | $B_{2,1}$ | $H_{2,1}$ | $B_{2,2}$ | $H_{2,2}$ |

|  | Sub-Image$_{i,1}$ |  | Sub-Image$_{i,2}$ |  |
|---|---|---|---|---|
| Sub-Image$_{1,j}$ | $G_{1,1}$ | $G_{1,2}$ | $R_{1,1}$ | $R_{1,2}$ |
|  | $G_{2,1}$ | $G_{2,2}$ | $R_{2,1}$ | $R_{2,2}$ |
| Sub-Image$_{2,j}$ | $B_{1,1}$ | $B_{1,2}$ | $H_{1,1}$ | $H_{1,2}$ |
|  | $B_{2,1}$ | $B_{2,2}$ | $H_{2,1}$ | $H_{2,2}$ |

*FIG. 2B*

|  | Pixel$_{i,1}$ | | Pixel$_{i,2}$ | | Pixel$_{i,3}$ | |
|---|---|---|---|---|---|---|
| Pixel$_{1,j}$ | 100 G$_{1,1}$ | 110 R$_{1,1}$ | 100 G$_{1,2}$ | 90 R$_{1,2}$ | 100 G$_{1,3}$ | 110 R$_{1,3}$ |
|  | 100 B$_{1,1}$ | 100 H$_{1,1}$ | 100 B$_{1,2}$ | 100 H$_{1,2}$ | 100 B$_{1,3}$ | 100 H$_{1,3}$ |
| Pixel$_{2,j}$ | 100 G$_{2,1}$ | 110 R$_{2,1}$ | 100 G$_{2,2}$ | 90 R$_{2,2}$ | 100 G$_{2,3}$ | 110 R$_{2,3}$ |
|  | 100 B$_{2,1}$ | 100 H$_{2,1}$ | 100 B$_{2,2}$ | 100 H$_{2,2}$ | 100 B$_{2,3}$ | 100 H$_{2,3}$ |
| Pixel$_{3,j}$ | 100 G$_{3,1}$ | 110 R$_{3,1}$ | 100 G$_{3,2}$ | 90 R$_{3,2}$ | 100 G$_{3,3}$ | 110 R$_{2,2}$ |
|  | 100 B$_{3,1}$ | 100 H$_{3,1}$ | 100 B$_{3,2}$ | 100 H$_{3,2}$ | 100 B$_{3,3}$ | 100 H$_{3,3}$ |

| | Sub-Image$_{i,1}$ | | | Sub-Image$_{i,2}$ | | |
|---|---|---|---|---|---|---|
| Sub-Image$_{1,j}$ | 100 $G_{1,1}$ | 100 $G_{1,2}$ | 100 $G_{1,3}$ | 110 $R_{1,1}$ | 90 $R_{1,2}$ | 110 $R_{1,3}$ |
| | 100 $G_{2,1}$ | 100 $G_{2,2}$ | 100 $G_{2,3}$ | 110 $R_{2,1}$ | 90 $R_{2,2}$ | 110 $R_{2,3}$ |
| | 100 $G_{3,1}$ | 100 $G_{3,2}$ | 100 $G_{3,3}$ | 110 $R_{3,1}$ | 90 $R_{3,2}$ | 110 $R_{2,3}$ |
| Sub-Image$_{2,j}$ | 100 $B_{1,1}$ | 100 $B_{1,2}$ | 100 $B_{1,3}$ | 100 $H_{1,1}$ | 100 $H_{1,2}$ | 100 $H_{1,3}$ |
| | 100 $B_{2,1}$ | 100 $B_{2,2}$ | 100 $B_{2,3}$ | 100 $H_{2,1}$ | 100 $H_{2,2}$ | $H_{2,2}$ |
| | 100 $B_{3,1}$ | 100 $B_{3,2}$ | 100 $B_{3,3}$ | 100 $H_{3,1}$ | 100 $H_{3,2}$ | 100 $H_{3,3}$ |

*FIG. 4B*

BARCODE SCANNER OPTIMIZATION

PRIORITY CLAIM

This application is a continuation of U.S. patent application Ser. No. 16/397,712, entitled "Barcode Scanner Optimization," filed on Apr. 29, 2019, the contents of which is hereby incorporated by reference herein in its entirety.

SUMMARY

Disclosed are barcode scanners and methods for scanning a barcode. The barcode scanners and methods for scanning a barcode may include receiving a raw image from a scanner. Channel information may be extracted from each pixel of the raw image. A composite image may be created using the channel information from each pixel of the raw image. Finally, product information may be extracted from the composite image.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 2A shows an example schematic of a raw image consistent with embodiments disclosed herein.

FIG. 2B shows an example schematic of a composite image consistent with embodiments disclosed herein.

FIG. 4A shows an example schematic of a raw image consistent with embodiments disclosed herein.

FIG. 4B shows an example schematic of a composite image consistent with embodiments disclosed herein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
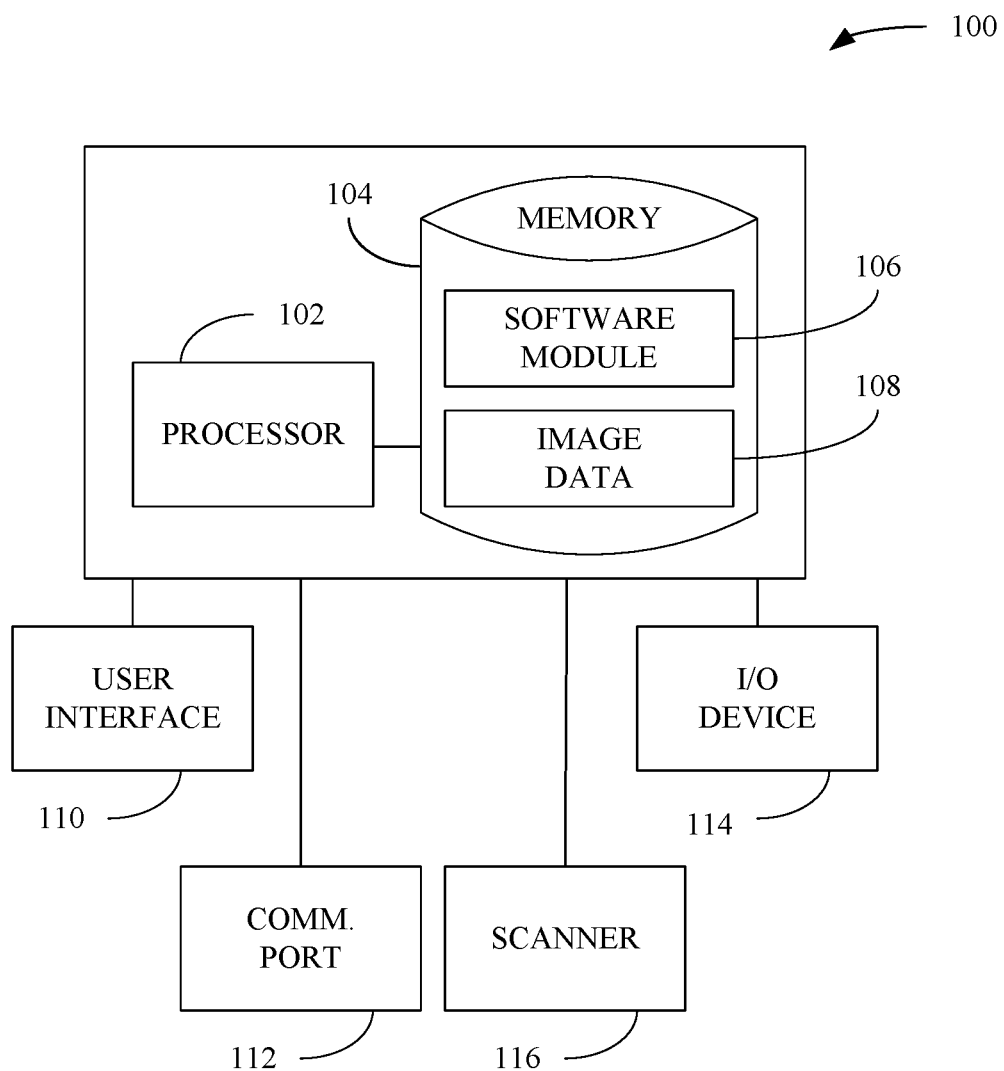
FIG. 1 shows an example schematic of a self-service terminal consistent with embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Traditional barcodes are black on a white background. As a result, using non-color scanners, or black and white scanners, could be used to read barcodes. Black and white barcode scanners may use a red light.

However, as disclosed herein, barcodes may be more than black and white, and may include black bars printed on color, such as red, blue, yellow, etc., backgrounds. As used in this disclosure, barcodes that include colors other than black and white are known as color barcodes.

Color barcodes may be used a part of security features used to help minimize theft. For example, the color of packaging may be known and stored in a database along with price lookup, also known as PLU, data. Using the color scanner may allow for the color of the packaging to be recorded when the barcode is scanned. If the color of the packaging does not match the color stored in the database, it may signify that a customer has taken a barcode from on item, e.g., an inexpensive item, and placed it on another item, e.g., an expensive item.

To read color barcodes, barcode scanners need to be color scanners. Stated another way, in order to scan color barcodes, barcode scanners may need to be able to distinguish between colors. To do this, white light and a color imager may be used.

Many people find red light barcode scanners makes them irritated or uncomfortable compared to white light scanners. Using a white light and a color imager allows the scanner to collect additional spectral data for use in security features. For example, as disclosed herein, the use of the color scanner may allow the scanner to collect packaging color data as a security check.

To take advantage of the security features, color information may need to be collected from the image sensor. As disclosed herein, one way to accomplish this may be to use a color sensor with a pixel array such as a Bayer Pattern color filter array sensor. However, using of a color sensor may introduce noise that may make some low contrast tags (i.e., barcodes or security features) difficult to read. One example of noise causing a problem with reading a tag is low contrast caused by red packaging with black barcodes. The difficulty in reading barcodes may be related to the purity of colors printed. For instance, a red background on a product may result in pixel values of 25% red, 15% blue, and 10% green where the black bars may be 10% red, 20% blue, and 15% green. For eye comfort and safety reasons, light used for scanning illumination must be limited.

Disclosed herein color scanners, self-service and full-service terminals that include color scanners, and methods for scanning color barcodes. In general, a raw image is received from the scanner. The raw image has a number of pixels and each pixel includes a number of channels. The information from each channel is filtered and rearranged to create a composite image. The composite image is then used to extract barcode information from the barcode.

"Channel," as used herein may refer to a certain component of an image. For instance, GIF images may refer to the color in each pixel by an index number, which may refer to a table where the color components are stored. However, regardless of how a specific format stores the images, discrete color channels can always be determined, as long as a final color image can be rendered. For instance, a red, green, blue (RGB) image may have has three channels: red, green, and blue.

Turning now to the figures, FIG. 1 shows an example schematic of a self-service terminal 100. As shown in FIG. 1, self-service terminal 100 may include a processor 102 and a memory 104. Memory 104 may include a software module 106 and image data 108. While executing on processor 102, software module 106 may perform processes for scanning a barcode, including, for example, one or more stages included in a method 300 described below with respect to FIG. 3. Self-service terminal 100 may also include a user interface 110, a communications port 112, an input/output (I/O) device 114, and a color scanner 116.

User interface 110 can include any number of devices that allow a user to interface with self-service terminal 100. Non-limiting examples of user interface 110 include a keypad, a microphone, a display (touchscreen or otherwise), etc.

Communications port 112 may allow self-service terminal 100 to communicate with various information sources and devices, such as, but not limited to, remote computing devices, mobile devices, peripheral devices, etc. These remote data sources may be databases that store product information such as PLU information. The product information may also be stored locally in memory 104. Non-limiting examples of communications port 112 include, Ethernet cards (wireless or wired), Bluetooth® transmitters and receivers, near-field communications modules, etc. User interface 110 may also use communications port 112 to communicate with self-service terminal 100. For example, user interface 110 may be a tablet computer that includes a virtual keyboard that communicates with self-service terminal 100 via communications port 112.

I/O device 114 may allow self-service terminal 100 to receive and output information. Non-limiting examples of I/O device 114 include, a camera, a weight detection device such as a scale, a printer for printing receipts and packing lists, scanner 116, etc. I/O device 114 may also utilize communications port 112 to communicate with self-service terminal 100. For example, I/O device 114 may be a scale that uses communications port 112 to communicate with self-service terminal 100 via a wired or wireless connection.

Scanner 116 may be a color scanner. During use, scanner 116 may capture images of a barcode and portions of packaging to which the barcode may be attached. The scanner may include a mosaic color filter array that has red, green, clear, and blue (RGCB) or red, green, infrared, and blue (RGIB) color filters on a square grid of photosensors. As discussed herein, the filter pattern may be 50% green, 25% red, and 25% blue. In addition, a cyan, magenta, and yellow filter pattern may be used with 50% yellow, 25% cyan, and 25% magenta filters.

Imaged data 108 may include raw images collected by scanner 116. The raw image data may include Bayer images. For example, as shown in FIG. 2A, a raw image 202 that is a 4 pixel image that is 2 pixels wide by 2 pixels tall. A 4 pixel image is used for clarity and demonstrative purposes. In practice, raw image 202 may by any number of pixels. For example, raw image 202 may be 1.8 megapixel image. As shown in FIG. 2A, each of the pixels may include four channels. The channels may be red (R), green (G and H), and blue (B). During operation of scanner 100, images captured by scanner 116 may be stored in imaged 108 as raw, or Bayer images.

As shown in FIG. 2A, each channel is identified by a color code (G, R, B, or H) and a pixel index (i or j). Thus, "$G_{1,1}$" is the green channel from the pixel in the first row and first column of raw image 202.

Image data 108 may also include images that have been processed as disclosed herein. For example, as shown in FIG. 2B, a composite image 204 may be stored in image data 108. Composite image 204 may include a rearrangement of the channel information for each of the pixels. For example, as shown in FIG. 2, the channel data from raw image 202 may be rearranged to form four sub-images. Each of the sub-images may be a grouping of similar channel information. Thus, composite image 204 is actually four images of lower resolution than a de-mosaiced image formed using raw image 202. For example, a 1280×960 pixel raw image may result in four sub-images of 640×480 resolution.

While FIG. 2B shows composite image of 4 sub-images, and raw image 202 is described as an image with four channels, raw image 202, and by consequence scanner 116, may have any number of channels. As a result, composite image 204 may include any number of sub-images.

The number of sub-images can be greater than or less than the number of channels. For example, the number of sub-images may be exactly to the number of channels as described in the examples disclosed herein. In addition, information from various channels may be combined, or de-mosaiced, to create a sub-image. For example, a sub-image may be created where the color values from a red channel are de-mosaiced with color values from a blue channel. In addition, multiple channel values may be used to create a sub-image. For instance, a sub-image may be created where the blue and both green channels are de-mosaiced to form a sub-image.

As used herein, each sub-image is identified by "sub-image$_{i,j}$," where "i" represents row and "j" represents a column in composite image 204. Thus, "sub-image$_{1,1}$" is the sub-image in the first row and first column of composite image 204. As shown in FIG. 2B, sub-image$_{1,1}$ is the sub-image created by grouping all of the G channel values, sub-image$_{1,2}$ is the sub-image created by grouping all of the R channel values, sub-image$_{2,1}$ is the sub-image created by grouping all of the B channel values, and sub-image$_{2,2}$ is the sub-image created by grouping all of the H channel values.

As shown in FIGS. 2A and 2B, image data 108 may be mosaic images. In addition, image data 108 may be de-mosaiced images. For example, raw image 202 may be processed using interpolation of the color values from each of the channels within a pixel to arrive at a color for the pixel. The de-mosaiced images may be used in conjunction with security features as disclosed herein while the Bayer images, raw image 202, and composite image 204 may be used to read the barcode and extract product information such as PLU information.

Using raw image 202 and composite image 204 may make reading a barcode easier than using a de-mosaiced image. As discussed herein, de-mosaiced images may utilize interpolation of color values to arrive at a color for a pixel. The interpolation may cause problems when there are sharp color changes, or one color is more power, or overpowers an adjacent color. For example, research leading to this disclosure revealed that a black barcode on a red background was found to cause difficulties for color scanners. Thus, using raw image 202 and composite image 204, red can be filtered using any of the sub-images that do not include the red channel. Thus, the black barcode may be less obscured when using one of the sub-images that does not include the red channel.

Figure 3:
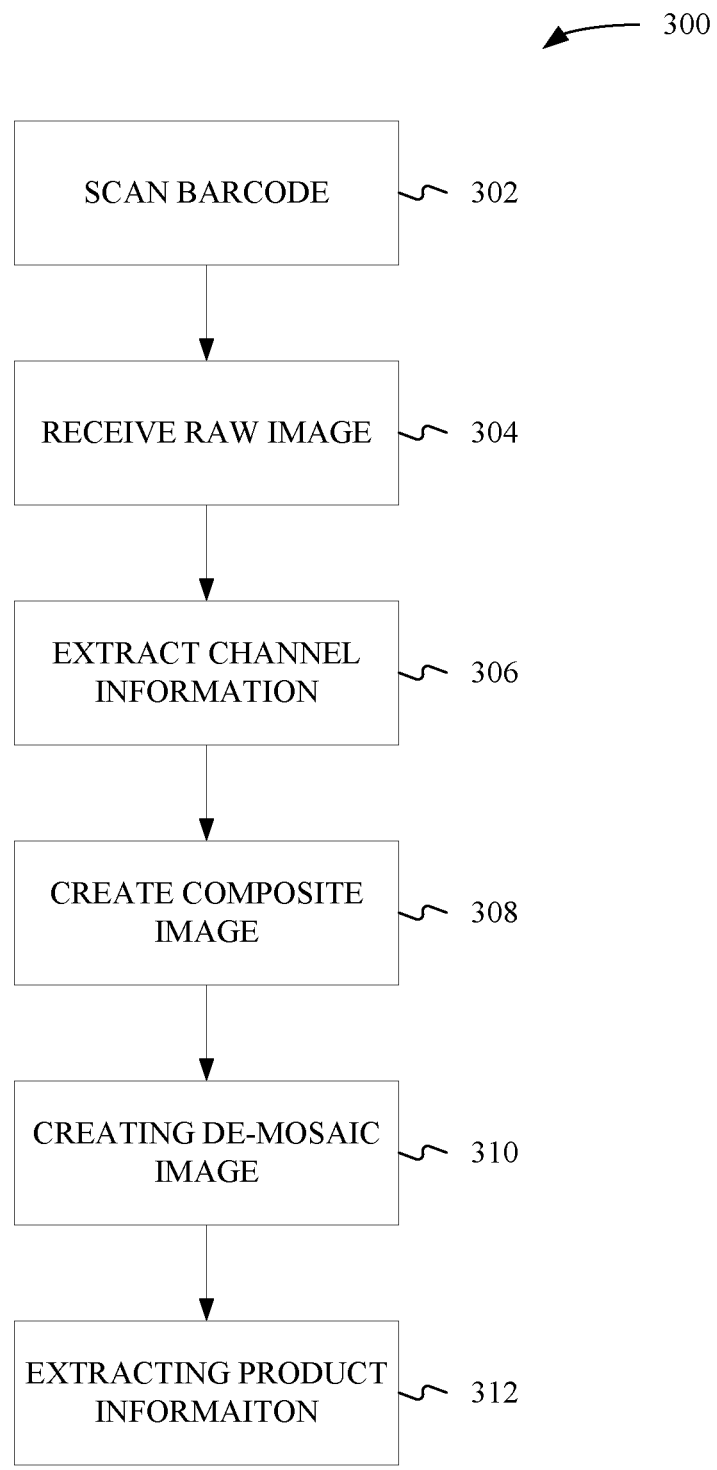
FIG. 3 shows an example method consistent with embodiments disclosed herein.

FIG. 3 shows an example method 300 for scanning a barcode as disclosed herein. Method 300 may include scanning a barcode using a color image scanner (302). Scanning the barcode may include passing the packaging of a product within the field of view of a scanner, such as scanner 116.

As the product is passed by the scanner, raw images may be received (304) by a processor, such as processor 102 of scanner 100. FIG. 4 shows an example of a raw image that may be received. As shown in FIG. 4A, the image may be a 3 pixel by 3 pixel image and each pixel may have four channels, a red (R), green (G), blue (B), and green (H) channel as described above with respect to image data 108.

During the scanning process, multiple images of the barcode may be captured and received by the processor.

Once the image, or images, are received, channel information may be extracted from each of the channels (306). For example, assume a barcode is scanned and the values shown in FIG. 4A are recorded. The values extracted in stage 306 may be differences in color value from a base datum. For example, one channel within the image may have a value lower than all the other channels within the image and the values extracted and stored may be the difference between a value of a respective channel and this lowest value. For instance, the lowest value in the image may be 50 and the value for an adjacent channel may be 60. Thus, the value for the lowest value channel may be recorded as 0 and the value for the adjacent channel may be 10. The actual value for each channel may also be extracted and recorded.

Each of the levels for green, both G and H, and blue may be 100. The levels for red may be 90 in pixels i,2 and 110 in the other pixels. For this example, it is assumed that a minimum difference between bar and space of the barcode requires a difference of more than 10 counts to be decoded using the raw data or a de-mosaiced image created from the raw data. As a result, using the data from raw image 402 shown in FIG. 4A, the self-service terminal will not be able to be decode the barcode. Also, in this example, the actual color information is not being used, only the contrast between color values. As a result, only values of X+/−10 or greater are decodable in this example.

Once the channel information has been extracted, one or more composite images may be created using the channel information from each pixel (308). As disclosed herein creating the composite image may include grouping corresponding channel information from each pixel. For example, the channel information from the red channel of each pixel may be grouped, the channel information from the blue channel of each pixel may be grouped etc.

Creating the composite image may include repositioning the channel information from each pixel. For example, as shown in FIG. 4B, the channel information from each pixel may be repositioned in an array. The array may correspond to various sub-images within the composite image. For example, as shown in FIG. 4B and described above with respect to FIG. 2B, the channel information from each of the green (G) channels may be grouped and positioned to form a first sub-image, the channel information from each of the red (R) channels may be grouped and positioned to form a second sub-image, etc. The identity of each sub-image may be defined in the array using matrix notation as shown in FIGS. 2B and 4B.

Each of the sub-images may be an array itself (e.g., a sub-array) where the position within the sub-array is a pixel of the sub-image. The channel information may be arranged within the sub-array using its pixel coordinates. This may result in the channel information being repositioned so that each pixel of the sub the sub-image has the same position within the sub-images at it had in the raw image. In other words, using the pixel coordinates to arrange the channel information results in the sub-image being a lower resolution image of the raw image.

Because the values for the blue and green channels are all 100, the scanner of the self-service terminal may not be able to decode the barcode using sub-image$_{1,1}$, sub-image$_{2,1}$, or sub-image$_{2,2}$. This is because, in this example, the scanner requires a value difference greater than 10 to decode the barcode. Using sub-image$_{1,2}$, the scanner may be able to decode the barcode because the value difference between pixels $R_{1,2}$, $R_{2,2}$, and $R_{3,2}$ differs from the values of pixels $R_{1,1}$, $R_{2,1}$, $R_{3,1}$, $R_{1,3}$, $R_{2,3}$, and $R_{3,3}$ by more than 10.

Once the composite image has been created, the raw image may be used to create a de-mosaiced image. The de-mosaic image may be used to identify security features on the packaging instead of being used to identify the barcode. For example, the de-mosaic image may be used to identify a color of the package, which may be checked against packaging data to ensure a customer has not replaced a barcode on an expensive item with a barcode from a cheaper item. The de-mosaic image may be created using interpolation as disclosed herein.

Once the composite image and the de-mosaic images are created, product information may be extracted from the images (312). For example, each of the sub-images in the composite image 402 may be processed to decode the barcode. With the barcoded decode, PLU information may be retrieved from a database and the price of the product may be determined so that the customer can purchase the item. The information retrieved from the database may also identify security features associated with the product. Both the composite image, or each of the sub-images from the composite image, and the de-mosaiced image may be processed to check for the security features. For example, the color of the packaging may be checking using the de-mosaiced image to determine if the color of the packaging matches an expected color. In addition, dimensions of the packaging may be extracted from the sub-images and/or the de-mosaiced image and checked against known dimensions of the package retrieved with the product information.

Examples

Example 1 is a method for scanning a color barcode, the method comprising: receiving, at a computing device, a raw image from a scanner; extracting, by the computing device, channel information from each pixel of the raw image; creating, by the computing device, a composite image using the channel information from each pixel of the raw image; and extracting product information from the composite image.

In Example 2, the subject matter of Example 1 optionally includes wherein receiving the raw image includes receiving an image of a color barcode.

In Example 3, the subject matter of any one or more of Examples 1-2 optionally include wherein receiving the raw image includes receiving the raw image from an optical scanner.

In Example 4, the subject matter of any one or more of Examples 1-3 optionally include wherein receiving the raw image includes receiving an image with four channels per pixel.

In Example 5, the subject matter of Example 4 optionally includes wherein creating the composite image includes: grouping corresponding channel information from each pixel to create four groupings of channel information, one grouping per channel per pixel; and repositioning each of the four groupings of channel information so that each of the four groupings forms a respective quadrant of the composite image.

In Example 6, the subject matter of any one or more of Examples 1-5 optionally include wherein extracting the channel information includes extracting a color value for each channel of each pixel.

In Example 7, the subject matter of any one or more of Examples 1-6 optionally include wherein creating the composite image includes remapping a color value for each channel of each pixel to one of four quadrants of the composite image.

In Example 8, the subject matter of any one or more of Examples 1-7 optionally include wherein the raw image is a non-mosaic image.

In Example 9, the subject matter of any one or more of Examples 1-8 optionally include wherein the product information include price lookup (PLU) information.

In Example 10, the subject matter of any one or more of Examples 1-9 optionally include creating a de-mosaic image using the raw image; and extracting the product information from the de-mosaic.

Example 11 is a system for scanning a color barcode, the system comprising: a processor; and a memory that stores instructions that, when executed by the processor, cause the processor to perform actions comprising: receiving a raw image from an optical scanner, extracting channel information from each pixel of the raw image, creating a composite image using the channel information from each pixel of the raw image, and extracting product information from the composite image.

In Example 12, the subject matter of Example 11 optionally includes wherein receiving the raw image includes receiving an image with four channels per pixel.

In Example 13, the subject matter of Example 12 optionally includes wherein creating the composite image includes: grouping corresponding channel information from each pixel to create four groupings of channel information, one grouping per channel per pixel; and repositioning each of the four groupings of channel information so that each of the four groupings forms a respective quadrant of the composite image.

In Example 14, the subject matter of any one or more of Examples 11-13 optionally include wherein extracting the channel information includes extracting a color value for each channel of each pixel.

In Example 15, the subject matter of any one or more of Examples 11-14 optionally include wherein creating the composite image includes remapping a color value for each channel of each pixel to one of four quadrants of the composite image.

Example 16 is a self-service terminal comprising: an optical scanner; a processor electrically coupled to the optical scanner; and a memory that stores instructions that, when executed by the processor, cause the processor to perform actions comprising: receiving a raw image from the optical scanner, extracting channel information from each pixel of the raw image, creating a composite image using the channel information from each pixel of the raw image, and extracting product information from the composite image.

In Example 17, the subject matter of Example 16 optionally includes wherein receiving the raw image includes receiving an image with four channels per pixel.

In Example 18, the subject matter of Example 17 optionally includes wherein creating the composite image includes: grouping corresponding channel information from each pixel to create four groupings of channel information, one grouping per channel per pixel; and repositioning each of the four groupings of channel information so that each of the four groupings forms a respective quadrant of the composite image.

In Example 19, the subject matter of any one or more of Examples 16-18 optionally include wherein extracting the channel information includes extracting a color value for each channel of each pixel.

In Example 20, the subject matter of any one or more of Examples 16-19 optionally include wherein creating the composite image includes remapping a color value for each channel of each pixel to one of four quadrants of the composite image.

In Example 21, the systems, self-service terminals, or methods of any one of or any combination of Examples 1-20 are optionally configured such that all elements or options recited are available to use or select from.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method for scanning a color barcode, the method comprising:
    illuminating the color barcode with white light;
    capturing a raw image of the color barcode with a color scanner;
    extracting, by a computing device, channel information from each pixel of the raw image;
    creating, by the computing device, a composite image using the channel information from each pixel of the raw image; and
    extracting product information from the composite image.

2. The method of claim 1, wherein extracting channel information includes extracting spectral data from each pixel of the raw image.

3. The method of claim 1, wherein capturing the raw image includes capturing four channels per pixel of the raw image.

4. The method of claim 3, wherein creating the composite image includes:
    grouping corresponding channel information from each pixel to create four groupings of channel information, one grouping per channel per pixel; and
    repositioning each of the four groupings of channel information so that each of the four groupings forms a respective quadrant of the composite image.

5. The method of claim 1, wherein extracting the channel information includes extracting a color value for each channel of each pixel.

6. The method of claim 1, wherein creating the composite image includes remapping a color value for each channel of each pixel to one of four quadrants of the composite image.

7. The method of claim 1, wherein the raw image is a non-mosaic image.

8. The method of claim 1, wherein the product information include price lookup (PLU) information.

9. The method of claim 1, further comprising:
    creating a de-mosaic image using the raw image; and
    extracting the product information from the de-mosaic.

10. A system for scanning a color barcode, the system comprising:
    a processor in electrical communication with the color scanner and a white light source; and
    a memory that stores instructions that, when executed by the processor, cause the processor to perform actions comprising:
        activating the white light source to illuminate the color barcode with white light,
        capturing a raw image of the color barcode using a color scanner, extracting channel information from each pixel of the raw image, creating a composite image using the channel information from each pixel of the raw image, and extracting product information from the composite image.

11. The system of claim 10, wherein extracting channel information includes extracting spectral data from each pixel of the raw image.

12. The system of claim 10, wherein capturing the raw image includes capturing four channels per pixel of the raw image.

13. The system of claim 12, wherein creating the composite image includes:

grouping corresponding channel information from each pixel to create four groupings of channel information, one grouping per channel per pixel; and repositioning each of the four groupings of channel information so that each of the four groupings forms a respective quadrant of the composite image.

14. The system of claim 10, wherein extracting the channel information includes extracting a color value for each channel of each pixel.

15. The system of claim 10, wherein creating the composite image includes remapping a color value for each channel of each pixel to one of four quadrants of the composite image.

16. The system of claim 10, further comprising:

creating a de-mosaic image using the raw image; and extracting the product information from the de-mosaic.

17. A self-service terminal comprising:

a color scanner;

a white light source;

a processor in electrical communication with the color scanner and the white light source; and a memory that stores instructions that, when executed by the processor, cause the processor to perform actions comprising:

activating the white light source to illuminate the color barcode with white light, capturing a raw image of the color barcode using the color scanner, extracting channel information from each pixel of the raw image, creating a composite image using the channel information from each pixel of the raw image, and extracting product information from the composite image.

18. The self-service terminal of claim 17, wherein receiving the raw image includes receiving an image with four channels per pixel, wherein creating the composite image includes:

grouping corresponding channel information from each pixel to create four groupings of channel information, one grouping per channel per pixel; and repositioning each of the four groupings of channel information so that each of the four groupings forms a respective quadrant of the composite image.

19. The self-service terminal of claim 17, wherein extracting the channel information includes extracting a color value for each channel of each pixel.

20. The self-service terminal of claim 17, wherein creating the composite image includes remapping a color value for each channel of each pixel to one of four quadrants of the composite image.

* * * * *